APPARATUS INCORPORATING A DICHROIC MIRROR

Filed Nov. 13, 1956

Inventor
S. F. Quinn
By Glascock Downing Seebold
Attys.

United States Patent Office 2,999,896

Patented Sept. 12, 1961

2,999,896

APPARATUS INCORPORATING A DICHROIC MIRROR

Stanley Frederick Quinn, Ashford, England, assignor to Electric & Musical Industries Limited, Middlesex, England, a company of Great Britain Filed Nov. 13, 1956, Ser. No. 621,823
Claims priority, application Great Britain Nov. 16, 1955
14 Claims. (Cl. 178—5.4)

Figure 1:
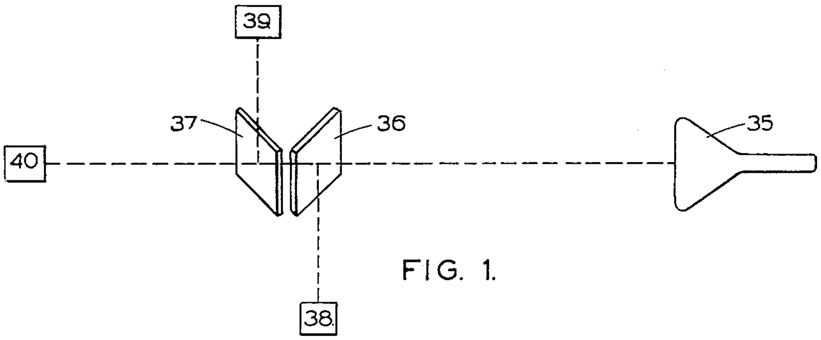

This invention relates to apparatus incorporating a dichroic mirror, and is particularly applicable to colour film scanners.

A dichroic mirror is formed by depositing layers of suitable substances of different refractive indices on a transparent base plate, so that certain wavelengths of light are reflected and the remainder are transmitted. It is usual to employ two such dichroic mirrors in colour film scanning apparatus for example, arranged to both transmit green light, and to reflect red and blue light respectively. A disadvantage of dichroic mirrors results from the fact that their spectral characteristics vary with the angle of incidence of the light, with the result that as scanning takes place the angle of incidence of the beam to the dichroics varies so that colour variations occur with a white field the colour variations resulting in the field being reddish at one extremity and greenish at the other.

The object of the present invention is to provide means for correcting for the aforesaid effect of variations in the spectral characteristics of dichroic mirrors due to variations in the angle of incidence of the light.

According to the invention there is provided apparatus incorporating a dichroic mirror on which light is incident with a varying angle of incidence, converting means for converting light from said mirror into electrical signals, and amplifying means for amplifying said electrical signals, in which the spectral characteristics of said mirror vary with said angle of incidence, and said apparatus includes means for varying the gain of said amplifying means in a manner related to said varying angle of incidence to reduce the effect of variations in the spectral characteristics of said mirror with variations in the angle of incidence of said light.

In a specific case the converting means for converting light from said mirror into electrical signals comprises a photo-electric cell and the amplifying means for amplifying said electrical signals are electron multiplying stages associated with said photo-electric cell, said multiplying stages and photo-electric cell forming a photo-electric multiplier. The gain of the amplifying means is varied by varying the potential applied to one of said multiplying stages.

Where it is desired to reduce the effect of variation in spectral characteristics of a dichroic mirror in a colour film scanner at line frequency, then the gain of the amplifying means will be varied at line frequency. This will be desirable, for example, in a colour film scanner in which it is arranged that the field scan direction on the surface of a dichroic mirror is at right angles to the principal axis of the optical elements of a scanner so that the variations in spectral characteristics is considerably greater in the line direction than in the field direction. In some cases, however, where the line scan direction is arranged to be at right angles to the principal axis as, for example, when stationary slides are being scanned, then the gain of the amplifying means will be varied at field frequency.

Figure 2:
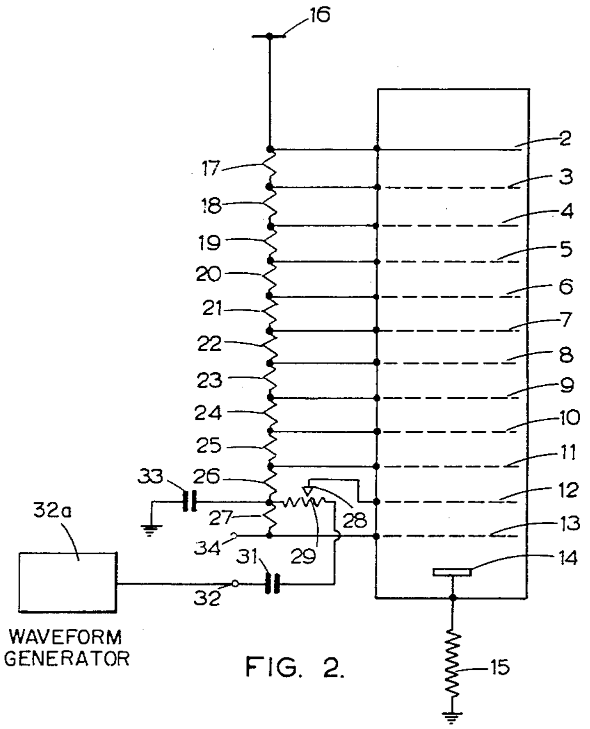

In order that the present invention may be clearly understood and readily carried into effect, reference will be made to the accompanying drawings, in which:

FIGURE 1 shows an arrangement of colour film scanning apparatus incorporating dichroic mirrors and photocells, FIGURE 2 shows a photocell multiplier the gain of which can be varied in accordance with the invention.

Referring to FIGURE 1 of the drawings there is shown a colour film scanner 35 and an arrangement of dichroic mirrors 36 and 37 both of which transmit green light, the dichroic 36 reflecting red light and the dichroic 37 reflecting blue light. The arrangement of the dichroics is such that the field scan direction on the surface of the dichroics is at right angles to the principal axis of the optical elements in the scanner and as shown the mirrors are inclined to said axis. Photocells 38, 39 and 40 are arranged to receive respectively said red, blue and green light and serve to convert light from the mirrors into electrical signals.

Each photocell 38, 39 and 40 is a photocell multiplier as shown in FIGURE 2 so that each photocell also constitutes amplifying means for said signals. As shown in this figure the multiplier comprises a photocathode 2, eleven multiplying electrodes or dynodes 3 to 13 and a collecting electrode 14. The various electrodes of the multiplier are connected in circuit in the following manner: the collector 14 is connected to ground via a resistor 15, and the dynodes 3 to 13 are connected to a high negative potential source indicated at 16 via resistors 17 to 27. The dynode 12, however, is connected to the slider 28 of a variable resistor 29, which is connected to the junction of the resistors 26 and 27 and to a condenser 31. The photo-cathode 2 is directly connected to said high negative potential source, and the junction of resistors 26 and 27 is connected to ground via a condenser 33. The dynode 13 is also connected to a negative potential via the supply terminal 34. A gain controlling saw-tooth or other suitable waveform is derived from a waveform generator **32*a*, and is applied to the dynode 12 via the terminal 32, the condenser 31, and the variable resistor 29. If desired a gas discharge voltage stabiliser tube may be connected across the resistor 27**.

During operation of the photocell shown in the drawing the terminal 34 may be maintained at a negative potential of about 150 volts whilst the potential of the source 16 may be a negative potential of 1.5 K. volts and the resistors 17 to 27 are suitably chosen so that the potential drop across each resistor provides a suitable operating potential for each of the dynodes 3 to 13. By applying the gain controlling waveform to the dynode 12 of each of the photocells employed it is possible to arrange that the resulting variations in the gains of the photocells serve to compensate for the sensitivity variations in spectral characteristics of the dichroics through which the light is passed. In an arrangement in which the field scan direction on the surface of the dichroics is perpendicular to the principal axis of the optical elements in the scanner as shown in FIGURE 1, it will be appreciated that the spectral characteristics of the dichroics will vary to a much greater extent in the direction of line scan than in the direction of field scan and with such an arrangement the principal component of the gain controlling waveform will be at line frequency so as to compensate for the varying spectral characteristics throughout the line scan. It will be understood that every design of dichroic mirror will have its own particular relationship between spectral characteristics and angle of incidence. Thus the characteristic of a dichroic mirror associated with one colour may vary such that the efficiency of reflection or transmission of said one colour increases as the angle of incidence increases, whilst the characteristic of the same dichroic mirror associated with another colour may vary such that the efficiency of reflection or transmission of said other colour decreases as the angle of incidence increases, for example according as to whether said one or another colour is reflected by or transmitted through the mirror. Hence the choice of the gain controlling waveform depends upon the characteristics of the particular mirror with respect to a particular colour.

When a dichroic mirror is arranged so as to be inclined to the mean position of a scanning light beam, in one scan direction the angle of incidence of the light will vary in one sense, that is said angle will continuously increase or decrease, from one extremity to the other of the scanned patch. Such a direction is the line scan direction with the arrangement shown in FIGURE 1, and it will be understood that in order to compensate for associated variations in spectral characteristics a gain controlling waveform which varies in amplitude in one sense during each line scan and has line scan frequency is employed. Such a waveform may, for example, conveniently be a sawtooth waveform, which may be either negative or positive depending upon whether the efficiency of reflection or transmission of the respective colour increases or decreases as the angle of incidence increases.

In the direction perpendicular to said one direction the angle of incidence of the light will decrease from one extremity to the centre and then increase from the centre to the other extremity of the scanned path. Such a direction is the field scan direction with the arrangement of FIGURE 1. In this case the efficiency of reflection or transmission of a colour will either increase or decrease on either side of the centre of the scanned path. Hence a gain controlling waveform will be chosen which has field scan frequency and either increases and then decreases, or decreases and then increases in amplitude during each cycle. In some cases it may be adequate to employ only a line frequency gain controlling waveform but if desired the lesser variations in spectral characteristics in the field scan direction may also be compensated for by including in said waveform a field frequency compensating component as described above. As shown in FIGURE 2 the gain controlling waveform is derived from a suitable waveform generator, the particular configuration of the waveform being predetermined in accordance with the spectral characteristics of the dichroic mirror concerned. If the gain controlling waveform is positive the potential difference between the dynodes 12 and 13 is arranged to be about six times less than the potential difference between the dynodes 11 and 12 in order that the gain controlling waveform applied to the dynode 12 may influence the secondary emission of the dynode 13 to a greater extent than that of the dynode 12. If the gain controlling waveform is negative the said arrangement of potential difference is, of course, reversed. The gain controlling waveform is not applied directly to the dynode 13 in this example due to the capacitance between said dynode 13 and the collector 14. The polarities of the waveform applied to the respective photocells will of course depend on the relative disposition of the photocells and the mirrors.

Where the invention is applied to a film scanner in which the line scan direction is at right angles to the surface of the mirrors then variations of spectral characteristics will occur mainly in the direction of field scan, in which case the principal component of the gain controlling waveform employed will be at field frequency.

Although the invention has been described with particular reference to its application to a colour film scanner it will be appreciated that it may be applied to any apparatus incorporating a dichroic mirror in which variations in spectral characteristics of said dichroic mirror due to changes in the angle of incidence of light is undesirable.

What I claim is:

1. Apparatus incorporating a dichroic mirror on which light is incident with a varying angle of incidence, converting means for converting light from said mirror into electrical signals, and amplifying means for amplifying said electrical signals, in which the spectral characteristics of said mirror vary with said angle of incidence, and said apparatus includes means for varying the gain of said amplifying means in a manner related to said varying angle of incidence to reduce the effect of variations in the spectral characteristics of said mirror with variations in the angle of incidence of said light.

2. Apparatus according to claim 1 comprising a photoelectric amplifying cell having a photocathode, a collecting electrode and a plurality of multiplying electrodes, said photocathode forming said converting means and said multiplying electrodes forming said amplifying means, and in which said means for varying the gain of said amplifying means comprises means for generating a gain controlling waveform related to the varying angle of incidence of said light and means for applying said gain controlling waveform to the second of said multiplying electrodes from said collecting electrode.

3. Apparatus according to claim 1 in which said means for varying the gain of said amplifying means comprises means for generating a sawtooth waveform, and means for applying said sawtooth waveform to said amplifying means.

4. Apparatus incorporating a dichroic mirror, means for scanning said mirror with a light spot, converting means for converting light from said mirror into electrical signals, and amplifying means for amplifying said electrical signals, in which the spectral characteristics of said mirror vary with the angle of incidence of light incident on said mirror, and said apparatus includes means for generating a gain controlling waveform related to the varying angle of incidence of said light spot, and means for applying said gain controlling waveform to said amplifying means to vary the gain of said amplifying means to reduce the effect of variations in the spectral characteristics of said mirror with said varying angle of incidence.

5. Colour film scanning apparatus incorporating a dichroic mirror, means for scanning said mirror in line and field directions with a light spot, converting means for converting light from said mirror into electrical signals, and amplifying means for amplifying said electrical signals, in which the spectral characteristics of said mirror vary with the angle of incidence of light incident on said mirror, and the field scan direction on the surface of said mirror is at right angles to the principal axis of said colour film scanning apparatus, and said apparatus includes means for varying the gain of said amplifying means at the frequency of scanning of said light spot in said line direction with the sense of the variation of said gain in each cycle thereof related to the varying angle of incidence of said light spot in said line direction, to reduce the effect of variations in the spectral characteristics of said mirror with variations in the angle of incidence of said light spot in said line direction.

6. Apparatus according to claim 5 comprising means for varying the gain of said amplifying means at the frequency of scanning of said light spot in said field direction with the sense of the variation of said gain in each cycle thereof related to the varying angle of incidence of said light spot in said field direction, to reduce the effect of variations in the spectral characteristics of said mirror with variations in the angle of incidence of said light spot in said field direction.

7. Apparatus according to claim 5 comprising a photoelectric amplifying cell having a photocathode, a collecting electrode and a plurality of multiplying electrodes, said photocathode forming said converting means and said multiplying electrodes forming said amplifying means, and in which said means for varying the gain of said amplifying means at the frequency of scanning of said light spot in said line direction comprises means for generating a gain controlling waveform related to the varying angle of incidence of said light spot in said line direction, and means for applying said gain controlling waveform to the second of said multiplying electrodes from said collecting electrode.

8. Apparatus according to claim 5 comprising a photoelectric amplifying cell having a photocathode, a collecting electrode and a plurality of multiplying electrodes, said photocathode forming said converting means and said multiplying electrodes forming said amplifying means, and in which said means for varying the gain of said amplifying means at the frequency of scanning of said light spot in said field direction comprises means for generating a gain controlling waveform related to the varying angle of incidence of said light spot in said field direction, and means for applying said gain controlling waveform to the second of said multiplying electrodes from said collecting electrode.

9. Apparatus according to claim 5 in which said means for varying the gain of said amplifying means comprises means for generating a sawtooth waveform at the frequency of scanning of said light spot in said line direction, and means for applying said sawtooth waveform to said amplifying means.

10. Colour film scanning apparatus incorporating a dichroic mirror, means for scanning said mirror in line and field directions with a light spot, converting means for converting light from said mirror into electrical signals, and amplifying means for amplifying said electrical signals, in which the spectral characteristics of said mirror vary with the angle of incidence of light incident on said mirror, and the line scan direction on the surfaces of said mirror is at right angles to the principal axis of said colour film scanning apparatus, and said apparatus includes means for varying the gain of said amplifying means at the frequency of scanning of said light spot in said field direction with the sense of the variation of said gain in each cycle thereof related to the varying angle of incidence of said light spot in said field direction, to reduce the effect of variations in the spectral characteristics of said mirror with variations in the angle of incidence of said light spot in said field direction.

11. Apparatus according to claim 10 comprising means for varying the gain of said amplifying means at the frequency of scanning of said light spot in said line direction with the sense of the variation of said gain in each cycle thereof related to the varying angle of incidence of said light spot in said line direction, to reduce the effect of variations in the spectral characteristics of said mirror with variations in the angle of incidence of said light spot in said line direction.

12. Apparatus according to claim 10 in which said means for varying the gain of said amplifying means comprises means for generating a sawtooth waveform at the frequency of scanning of said light spot in said field direction, and means for applying said sawtooth waveform to said amplifying means.

13. Colour film scanning apparatus incorporating a dichroic mirror, means for scanning said mirror in line and field directions with a light spot, converting means for converting light from said mirror into electrical signals, and amplifying means for amplifying said electrical signals, in which the spectral characteristics of said mirror vary with the angle of incidence of light incident on said mirror, and the field scan direction on the surface of the mirror is at right angles to the principal axis of said colour film scanning apparatus, and said apparatus includes means for generating a gain controlling waveform and means for applying said gain controlling waveform to said amplifying means, said waveform having a sawtooth component at the frequency of scanning of said light spot in said line direction and a component with a configuration related to the variation in angle of incidence of said light spot in said field direction at the frequency of scanning of said light spot in said field direction, to reduce the effect of variations in the spectral characteristics of said mirror with variations in the angle of incidence of said light spot in said line and field directions.

14. Colour film scanning apparatus incorporating a dichroic mirror, means for scanning said mirror in line and field directions with a light spot, converting means for converting light from said mirror into electrical signals, and amplifying means for amplifying said electrical signals, in which the spectral characteristics of said mirror vary with the angle of incidence of light incident on said mirror and the line scan direction on the surface of the mirror is at right angles to the principal axis of said colour film scanning apparatus, and said apparatus includes means for generating a gain controlling waveform and means for applying said gain controlling waveform to said amplifying means, said waveform having a sawtooth component at the frequency of scanning of said light spot in said field direction and a component with a configuration related to the variation in angle of incidence of said light spot in said line direction at the frequency of scanning of said light spot in said line direction, to reduce the effect of variations in the spectral characteristics of said mirror with variations in the angle of incidence of said light spot in said line and field directions.

References Cited in the file of this patent

UNITED STATES PATENTS

| | | |
|---|---|---|
| 2,548,829 | Bedford | Apr. 10, 1951 |
| 2,583,143 | Glick | Jan. 22, 1952 |
| 2,627,547 | Sziklai | Feb. 3, 1953 |
| 2,658,102 | Goldsmith | Nov. 3, 1953 |
| 2,707,238 | Fromm | Apr. 28, 1955 |
| 2,740,828 | Haynes | Apr. 3, 1956 |
| 2,808,456 | Wittel | Oct. 1, 1957 |